United States Patent
Sato

(10) Patent No.: US 7,275,832 B2
(45) Date of Patent: Oct. 2, 2007

(54) SCREEN BOX APPARATUS, PROJECTING APPARATUS, AND PROJECTING METHOD

(75) Inventor: Osamu Sato, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/439,947

(22) Filed: May 25, 2006

(65) Prior Publication Data

US 2006/0268233 A1    Nov. 30, 2006

(30) Foreign Application Priority Data

May 31, 2005    (JP) .............................. 2005-159468

(51) Int. Cl.
*G03B 21/14*    (2006.01)
(52) U.S. Cl. .......................................... 353/13; 353/79
(58) Field of Classification Search .................. 353/12, 353/13, 14, 71, 72, 73, 74, 79, 119
See application file for complete search history.

(56) References Cited

U.S. PATENT DOCUMENTS

| | | | | |
|---|---|---|---|---|
| 5,281,985 | A * | 1/1994 | Chan ............................ | 353/13 |
| 6,379,012 | B1 * | 4/2002 | Enochs et al. ................. | 353/79 |
| 7,021,771 | B2 * | 4/2006 | Dwyer et al. .................. | 353/79 |
| 7,025,462 | B2 * | 4/2006 | Dwyer et al. .................. | 353/71 |
| 7,036,936 | B2 * | 5/2006 | Hattori et al. ................. | 353/13 |

FOREIGN PATENT DOCUMENTS

| | | |
|---|---|---|
| JP | 7-154723 | 6/1995 |
| JP | 7-162783 | 6/1995 |
| JP | 07-162783 | * 6/1995 |
| JP | 2000-142260 | 5/2000 |
| JP | 2000-326790 | 11/2000 |
| JP | 2004-224235 | 8/2004 |

* cited by examiner

*Primary Examiner*—William C. Dowling
(74) *Attorney, Agent, or Firm*—Pillsbury Winthrop Shaw Pittman, LLP

(57) ABSTRACT

A projecting apparatus has a projector section which projects projection light in response to an inputted picture signal, a cabinet section which stores the projector section, a connector section having a function of connecting the cabinet section to a vehicle interior ceiling, and a screen section provided on one side face of the cabinet section, the screen section having a transmission type screen member which displays a picture when projection light is irradiated from the projector section, and also having a function of selectively removing the screen member from a passage of the projection light or attachably demounting the screen member from the cabinet section, thereby irradiating the projection light to the outside of the cabinet section.

7 Claims, 8 Drawing Sheets

SCREEN BOX APPARATUS, PROJECTING APPARATUS, AND PROJECTING METHOD

CROSS-REFERENCE TO RELATED APPLICATIONS

This application is based upon and claims the benefit of priority from Japanese Patent Application No. 2005-159468, filed May 31, 2005, the entire contents of which are incorporated herein by reference.

BACKGROUND

1. Field

One embodiment of the present invention relates to a projecting apparatus having a lamp section, and in particular, to a screen box apparatus, a projecting apparatus, and a projecting method, which can be installed inside of a vehicle.

2. Description of the Related Art

Recently, a plenty of digital video devices have been prevalent, and, for example, there is a projecting apparatus using a light source lamp such as a liquid crystal projector or a DLP projector. In such a projecting apparatus, its basic performance is improved and there is a demand for a variety of uses. That is, there is a demand for viewing a projector in a vehicle, and some prior arts relating to responding to this demand are known.

Patent document 1 (Jpn. Pat. Appln. KOKAI Publication No. 7-162783) discloses an on-board projector apparatus for viewing a projector on its dedicated screen from a rear seat. In this case, picture light can be projected on a screen by changing an angle of a main body of the apparatus.

In addition, patent document 2 (Jpn. Pat. Appln. KOKAI Publication No. 2004-224235) discloses an on-board display device which enables to view a picture by irradiating picture light from a projector to a windshield of a vehicle.

In the above patent documents 1 and 2, there is merely disclosed a fixed viewing method in a comparatively small space in a vehicle. However, in the recent tendency of vehicles, there have been widely prevalent a car model called a wagon type having its high ceiling in a vehicle and riding seats and baggage chamber in one space, or a car model called a minivan type having three line seats for six to eight persons. With respect to such car models having their wide spaces in vehicles, there is further a possibility of viewing a variety of projectors. However, these prior arts have a problem that such a viewing method is not mentioned.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there are provided a projecting apparatus, a screen box apparatus, and a projecting method which are capable of carrying out projection of a variety of pictures inside or outside vehicle. The projecting apparatus comprises a projector section which projects projection light in response to an inputted picture signal; a cabinet section which stores the projector section; a connector section having a function of connecting the cabinet section to a vehicle interior ceiling; and a screen section provided on one side face of the cabinet section, the screen section having a transmission type screen member which displays a picture when projection light from the projector section is irradiated, and also having a function of selectively removing the screen member from a passage of the projection light or attachably demounting the screen member from the cabinet section, thereby irradiating the projection light outside of the cabinet section.

With the above-described projecting apparatus, it is possible to carry out a variety of viewing activities such as projecting a picture on a screen provided in a cabinet having a projecting apparatus stored therein; projecting a picture on a screen provided inside of a vehicle; and projecting a picture on a screen outside of the vehicle.

Hereinafter, preferred embodiments of a projecting apparatus according to an embodiment of the present invention will be described in detail with reference to the accompanying drawings. The projecting apparatus according to the embodiment of the invention is capable of projecting a picture on a screen provided at a cabinet section for storing the projecting apparatus, and projecting a picture on a screen provided outside of the cabinet section and inside of a vehicle. Hereinafter, in particular, a projecting apparatus which is a projector apparatus will be described in detail by way of example with reference to the accompanying drawings.

Figure 1A:
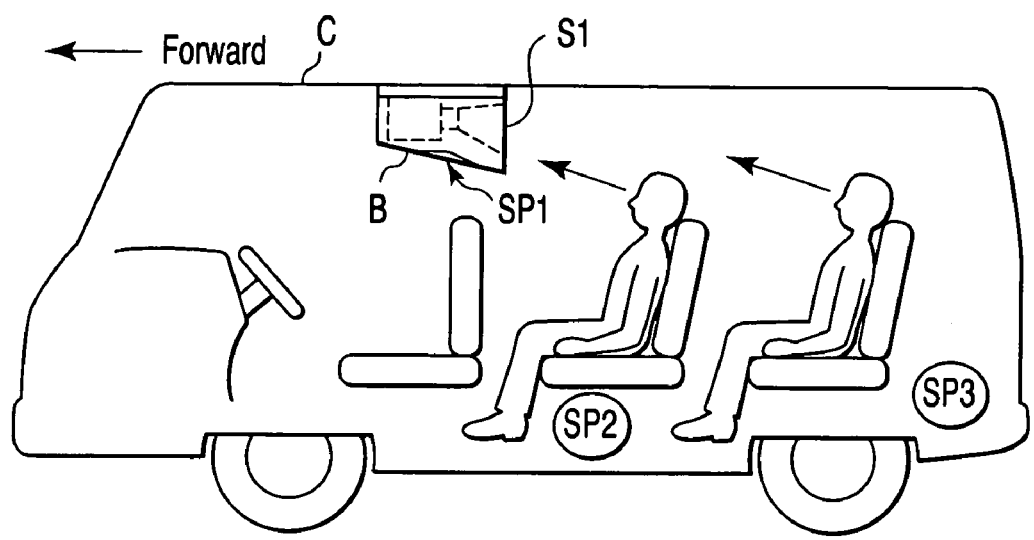
FIGS. 1A and 1B are illustrative views which respectively illustrate examples of projection on a first screen and on a second screen of a projecting apparatus according to one embodiment of the present invention.
Figure 1B:
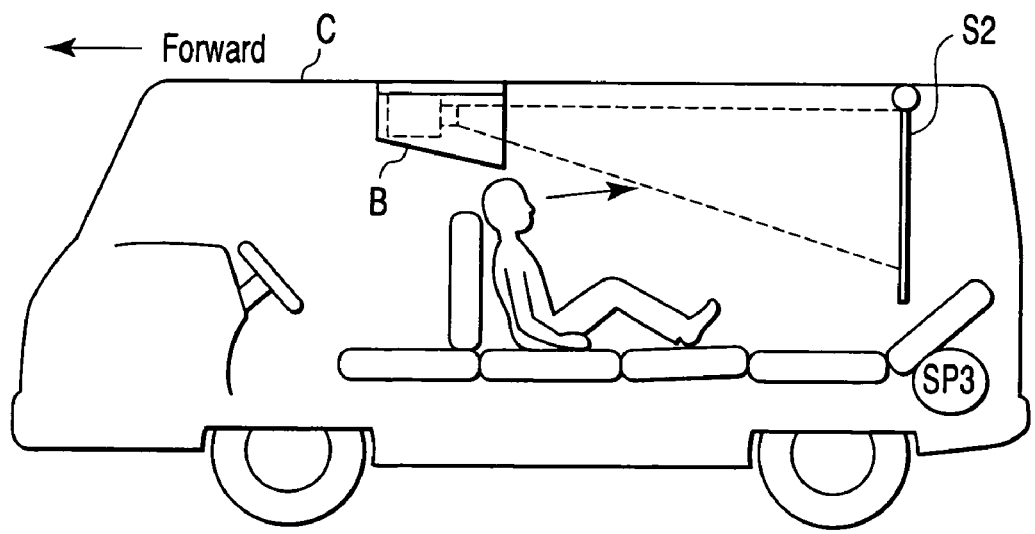
Figure 2A:
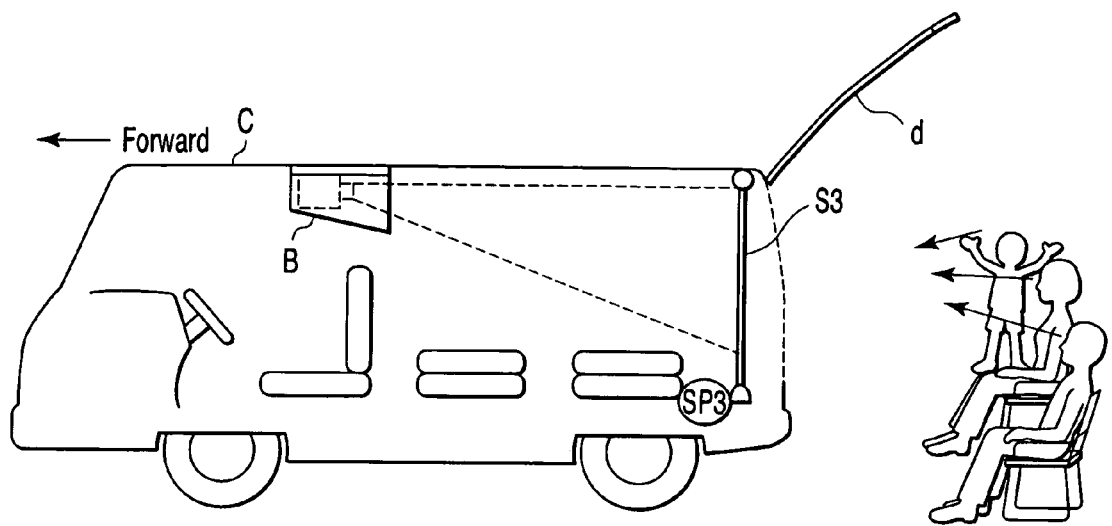
FIGS. 2A and 2B are illustrative views which respectively illustrate examples of projection on a third screen and on a fourth screen of the projecting apparatus according to the embodiment of the present invention.
Figure 2B:
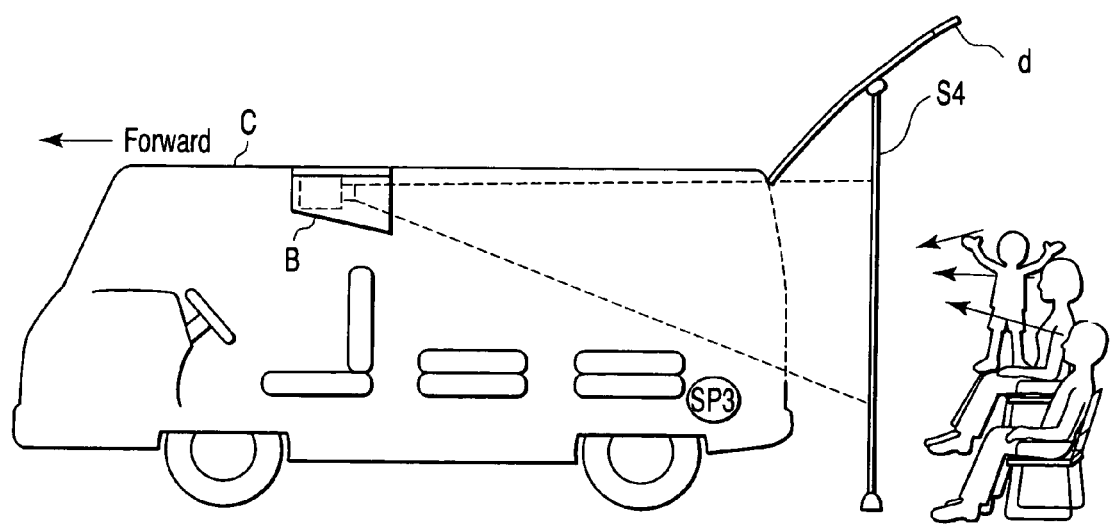
Figure 3:
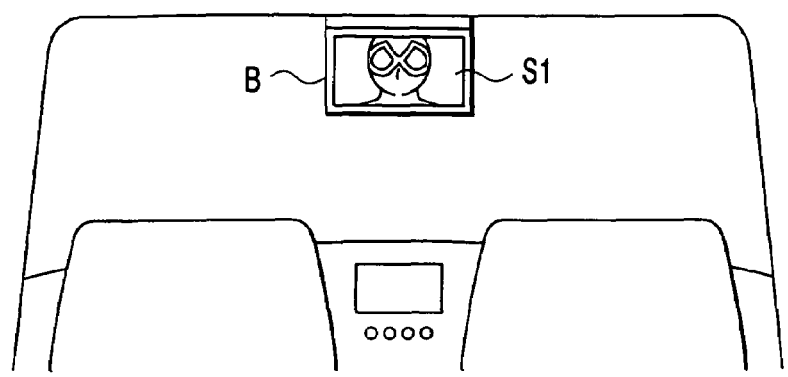
FIG. 3 is an illustrative view illustrating an example of projection on the first screen of the projecting apparatus according to the embodiment of the present invention.
Figure 4:
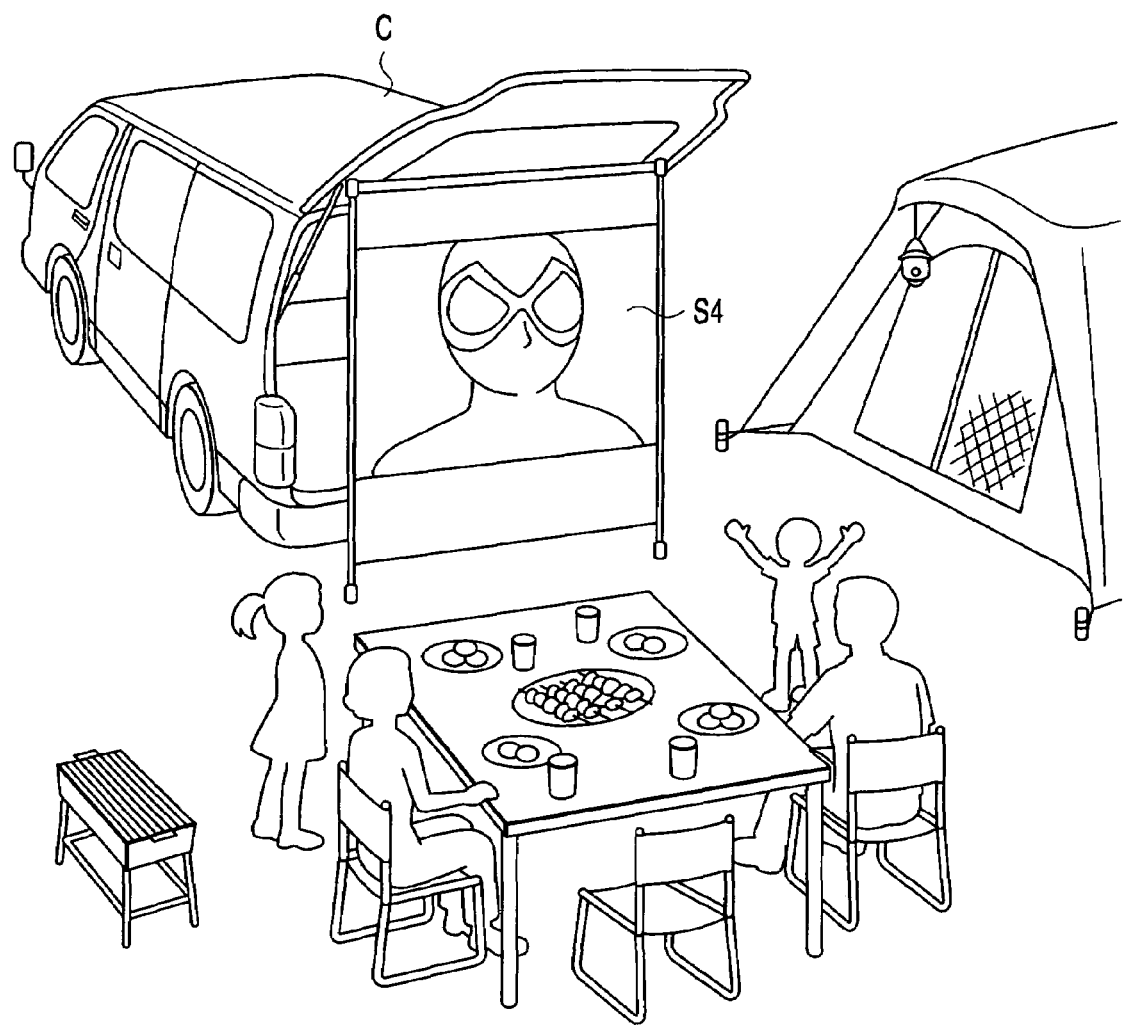
FIG. 4 is an illustrative view illustrating an example of exterior projection on the fourth screen of the projecting apparatus according to the embodiment of the present invention.
Figure 5:
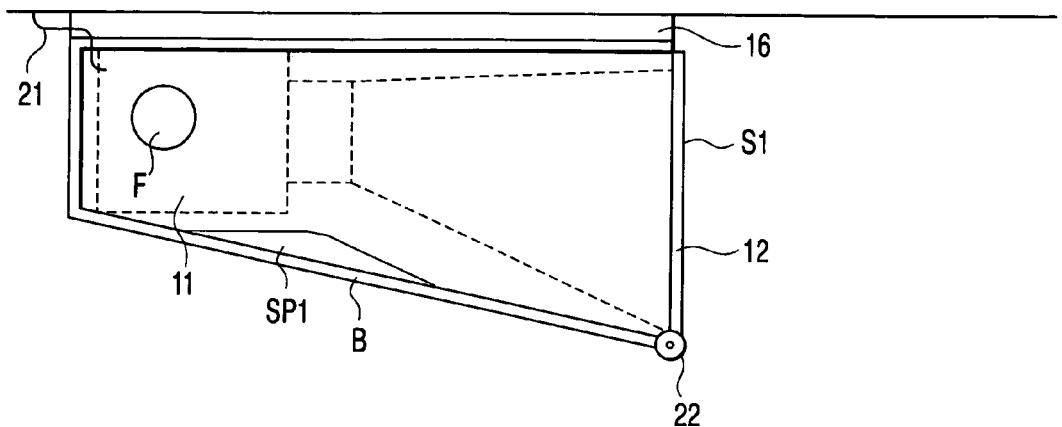
FIG. 5 is a sectional view showing an example of the projecting apparatus and a screen box according to the embodiment of the present invention.
Figure 6:
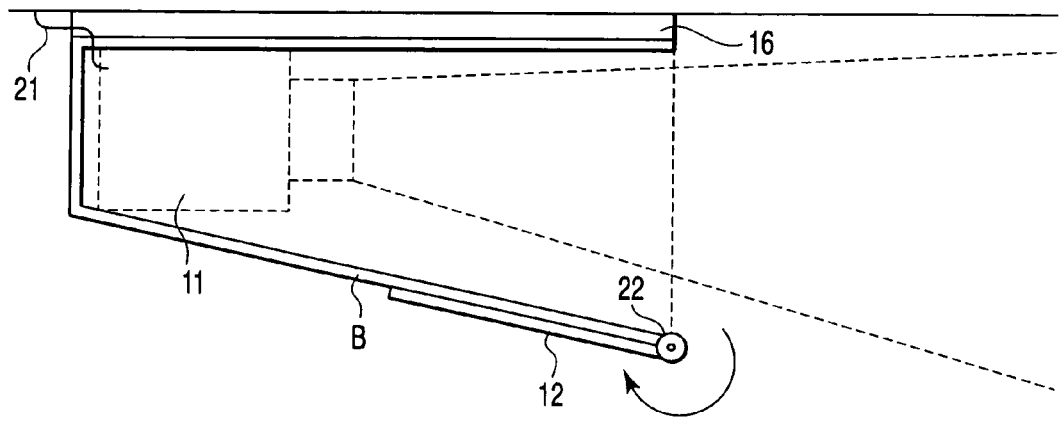
FIG. 6 is a sectional view showing an example of the projecting apparatus and the screen box according to the embodiment of the present invention.
Figure 7:
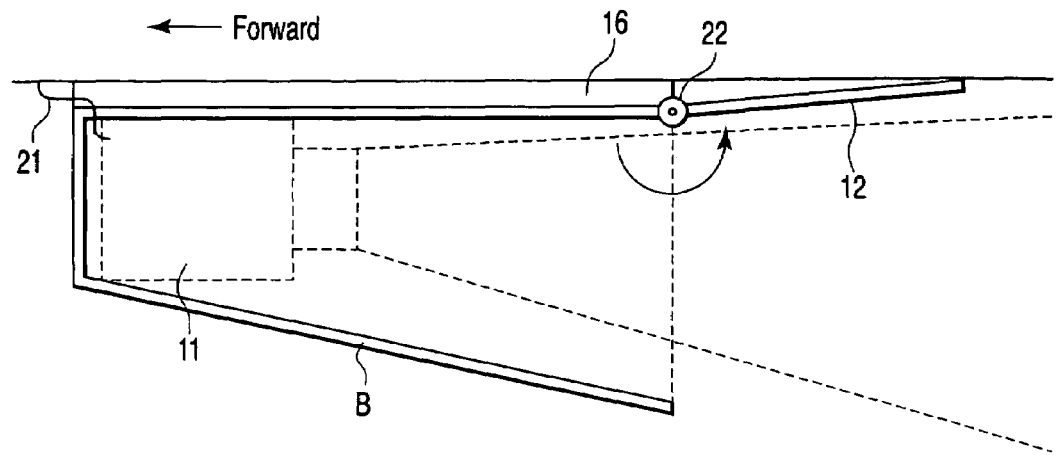
FIG. 7 is a sectional view showing an example of the projecting apparatus and the screen box according to the embodiment of the present invention.
Figure 8:
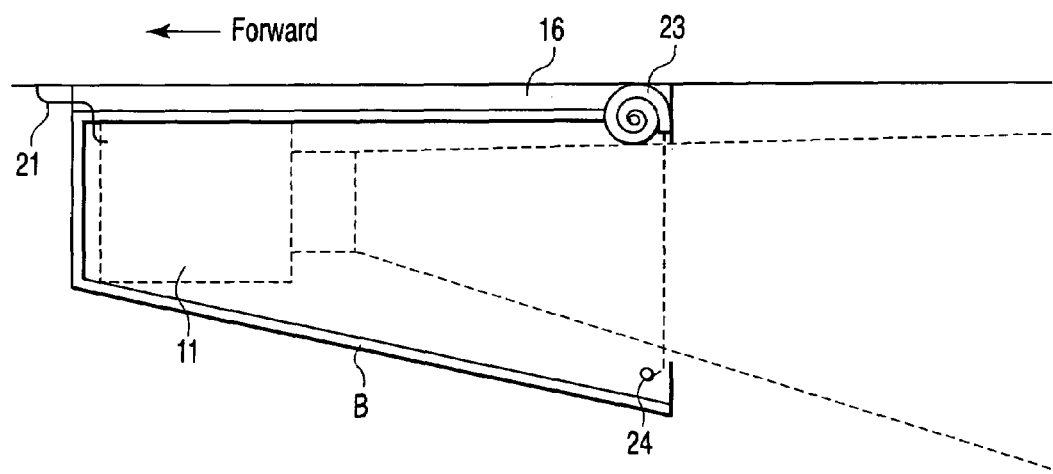
FIG. 8 is a sectional view showing an example of the projecting apparatus and the screen box according to the embodiment of the present invention.
Figure 9:
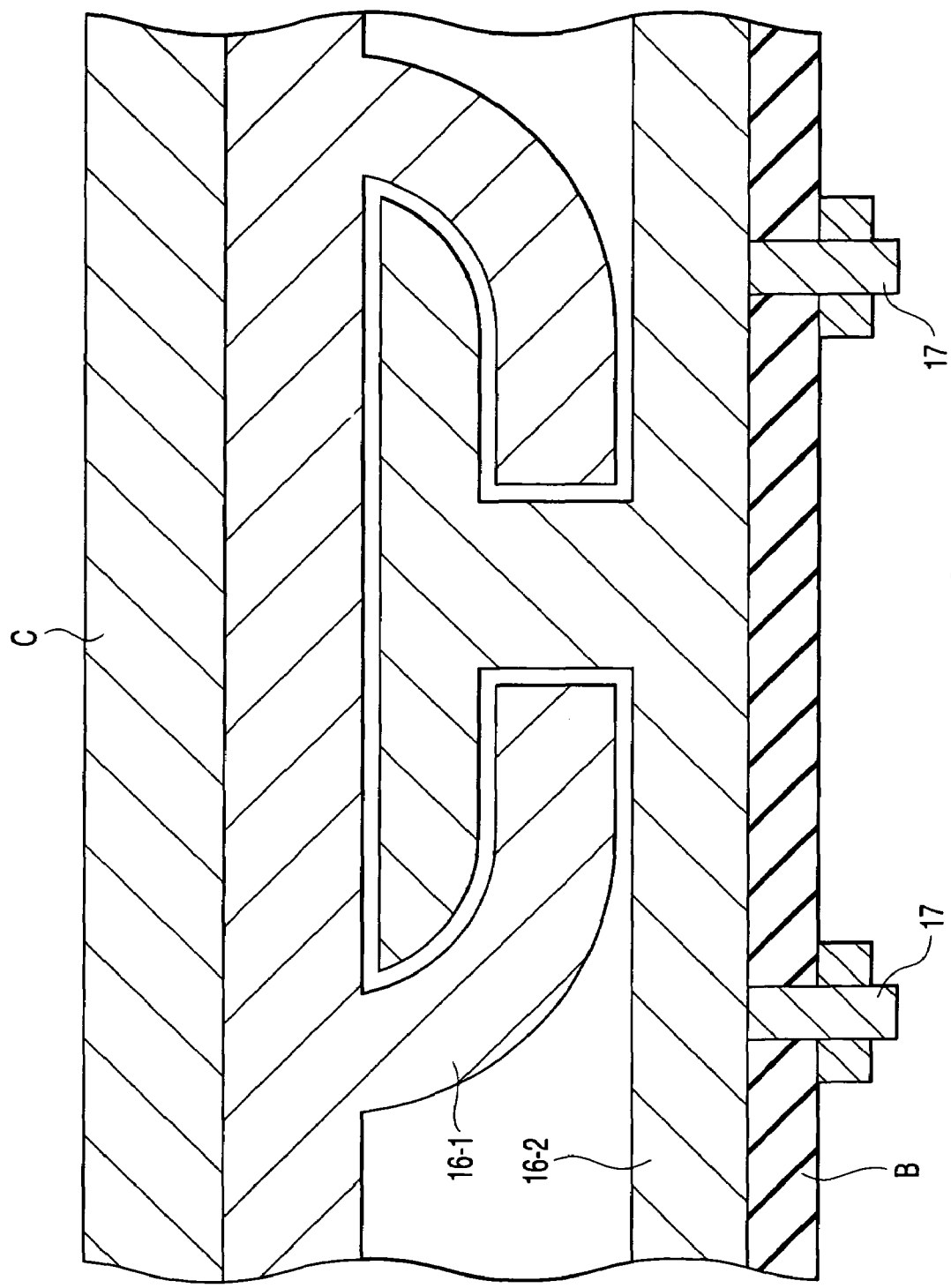
FIG. 9 is a sectional view illustrating connection between a vehicle's ceiling and the screen box of the projecting apparatus according to the embodiment of the present invention.
Figure 10:
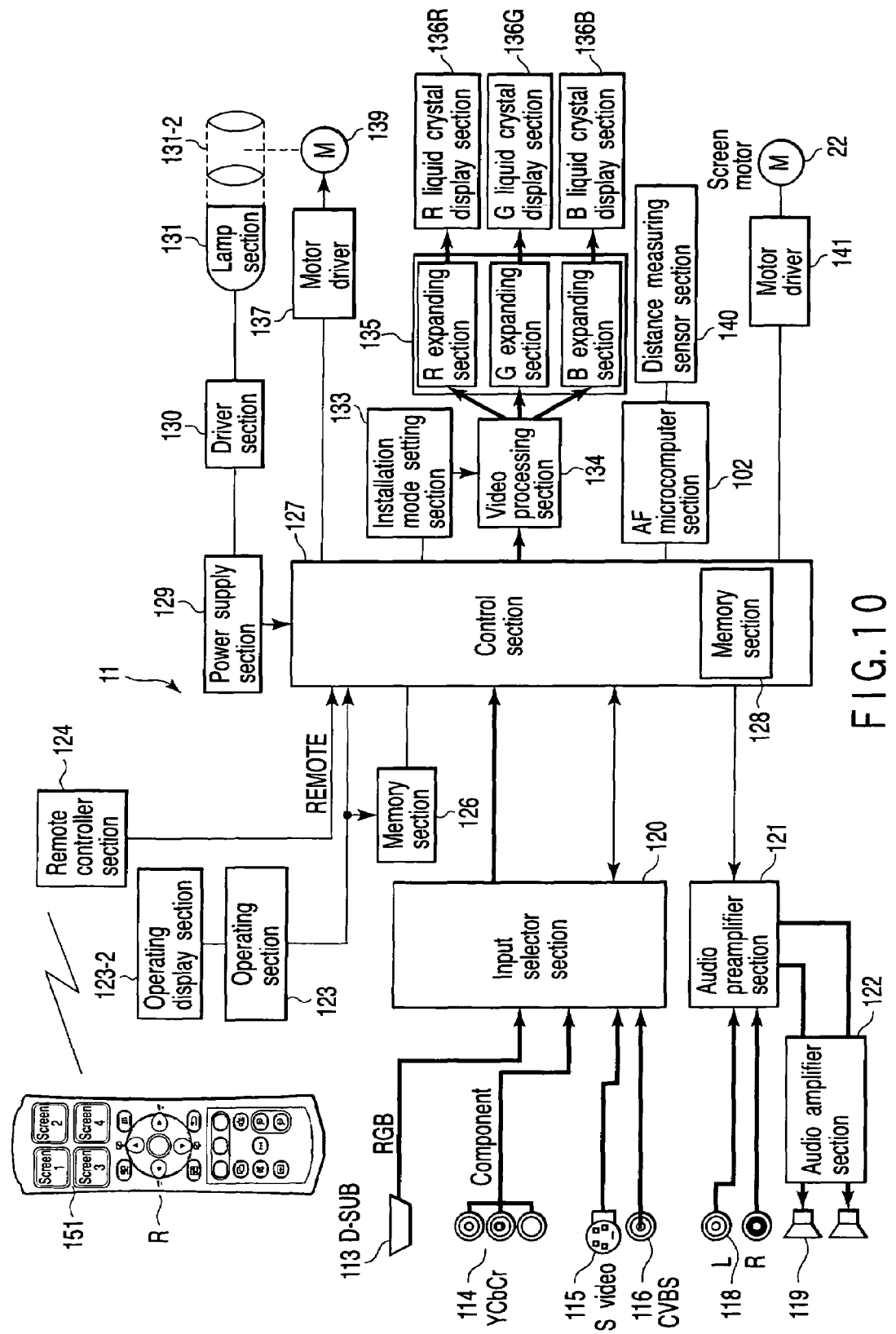
FIG. 10 is a block diagram depicting an example of a configuration of a projecting apparatus according to one embodiment of the present invention.
Figure 11:
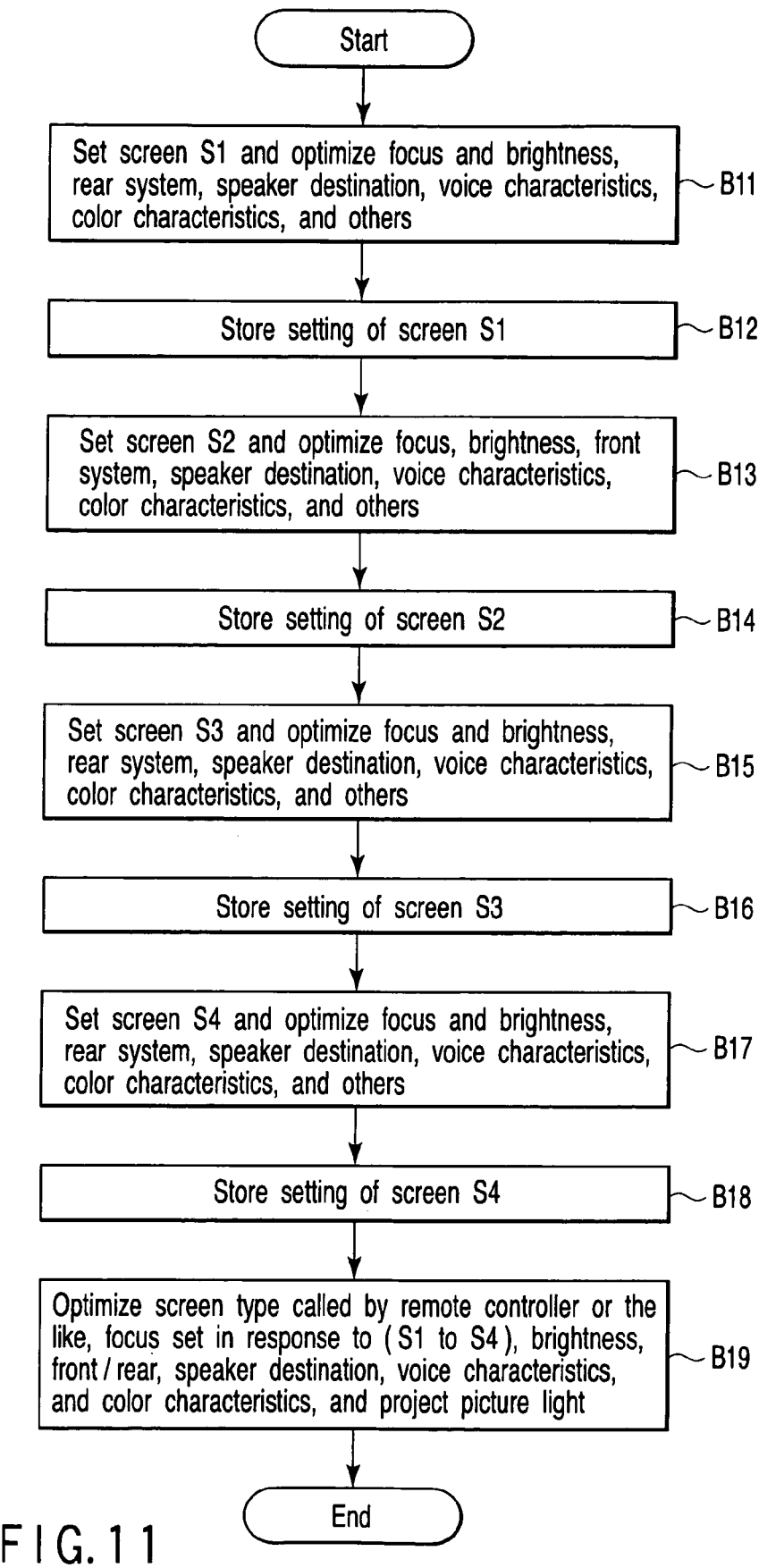
FIG. 11 is a flow chart showing an example of a setting process and an operating process of the projecting apparatus according to the embodiment of the present invention.

That is, FIGS. 1A and 1B are illustrative views which respectively illustrate examples of projection on a first screen and on a second screen of the projecting apparatus according to the embodiment of the invention. FIGS. 2A and 2B are illustrative views which respectively illustrate examples of projection on a third screen and on a fourth screen of the projecting apparatus according to the embodiment. FIG. 3 is an illustrative view illustrating an example of projection on the first screen of the projecting apparatus according to the embodiment. FIG. 4 is an illustrative view illustrating an example of exterior projection on the fourth screen of the projecting apparatus according to the embodiment. FIG. 5 is a sectional view showing an example of the projecting apparatus and a screen box according to the embodiment. FIG. 6 is a sectional view showing an example of the projecting apparatus and the screen box according to the embodiment. FIG. 7 is a sectional view showing an example of the projecting apparatus and the screen box according to the embodiment. FIG. 8 is a sectional view showing an example of the projecting apparatus and the screen box according to the embodiment. FIG. 9 is a sectional view illustrating connection between a vehicle's ceiling and the screen box of the projecting apparatus according to the embodiment. FIG. 10 is a block diagram depicting an example of a configuration of a projecting apparatus according to one embodiment of the present invention. FIG. 11 is a flow chart showing an example of a setting process and an operating process of the projecting apparatus according to the embodiment.

Projecting Apparatus According to One Embodiment of the Present Invention (Outline of Viewing Mode)

First, at least four types of modes of a projecting method of a projecting apparatus according to one embodiment of the present invention will be described below with reference to the accompanying drawings. The present invention is not limited to these modes.

Screen S1 of Screen Box (Rear System: In-Vehicle Viewing) (FIGS. 1A and 3)

This method is featured by viewing on a screen S1 of a screen box B, is a basic viewing mode, and is used in the case of in-vehicle viewing using a rear system. Although a screen size becomes minimal, stable viewing can be achieved at a rear seat. That is, since a projector section 11 is not exposed, and is arranged in the screen box B, the projector section is covered with the screen box B from the projector section 11 to the screen S1. In this manner, an effect of external light can be reduced to the minimum, thus making it possible to view a picture even during a daytime.

Screen 2 Inside of Vehicle (Front System: In-Vehicle Viewing) (FIG. 1B)

This method is featured in that a dedicated screen S2 is installed at the rear of a rear seat inside a vehicle or at a position at which third line seats have been fallen, so that in-vehicle viewing can be achieved in accordance with a front system. A viewing screen is much larger than the screen S1, and a visually impactful picture can be viewed even during traveling. However, viewing during a daytime when the weather is fine is difficult, and there is a need for properly rearranging seats as shown in FIG. 1B.

Here, in the case of the front system, there is a difference therebetween in that a target image is projected while the image is inverted on the left and right as compared with the rear system. At this time, it is preferable to reproduce a voice in a front speaker and a rear speaker while its left and tight are exchanged.

Screen S3 Inside of Vehicle (Rear System: In-Vehicle Viewing) (FIG. 1C)

This method is featured in that a dedicated screen S3 is installed at the rear of a third line seat, i.e., around a position at which a baggage is to be placed, a back door d is opened in accordance with the rear system, so that a vehicle external viewing is achieved. A viewing screen is further larger than the screen S2, and a visually impactful picture can be viewed.

Screen S4 outside of vehicle (rear system: vehicle external viewing) (FIGS. 2B and 4)

This method is featured in that a picture is projected in accordance with the rear system onto a dedicated screen S4 installed at a proper position of the back door d, and vehicle external viewing is achieved. A viewing screen is further larger than the screen S3, and constituent elements of a vehicle can be covered. Therefore, as in a general projector's screen, a sample installation method allows a visually impactful picture to be viewed on a large screen among a large number of persons without any unnatural feeling at a site such as, for example, an outdoor campground as shown in FIG. 4.

(Configuration of Projecting Apparatus)

A projecting apparatus according to an embodiment of the present invention will be described below in detail with reference to the accompanying drawings. The projecting apparatus according to the present invention has at least: a screen box B which is a cabinet section formed in a box shape of a member which does not transmit light; a connector unit 16 for stably connecting the screen box B with a ceiling of a vehicle C; a projector section 11 having a function of a main body of the projecting apparatus; a dedicated screen member 12 for a dedicated screen S1, which is removable or can be automatically removed from a passage of the projection light from the projector section 11 by means of a motor 22 or the like; and a motor mechanism 22 for housing the dedicated screen member 12. Further, it is preferable that the projecting apparatus according to the present invention should have: a speaker SP1 provided at, for example, a bottom of the screen box B; and a fan F for heat ventilation. In addition, a wiring line 21 for inputting and outputting an external power supply, a picture, and a voice is allocated.

In such a configuration, for example, the motor mechanism 22 is intended to drive a hinge mechanism for retaining the dedicated screen member 12. By driving a control section 127 and a motor driver 141 described later, the dedicated screen member 12 is housed in the bottom side of the screen box B of the projecting apparatus, as shown in FIG. 6.

In addition, it is also preferable that the motor 22 for housing the screen member 12 is provided at an upper edge portion of the screen box B as shown in FIG. 7, and that the motor mechanism is stopped after sensing that the mechanism has fully swung at the ceiling side in the vehicle by driving the control section 127 and the motor driver 141.

Further, as shown in FIG. 8, it is preferable that the screen member 12 is made of a flexible member that can be taken up; a dedicated take-up motor mechanism 23 is provided; and the screen member is taken up by driving the control section 127 and the motor driver 141 described later. Furthermore, a take-up motor mechanism 24 paired with the motor mechanism may be provided so that the taken-up screen member 12 and the take-up motor mechanism 24 are connected to each other by a transparent member or the like. When an attempt is made to use the screen member 12 again, the motor mechanisms 23, 24 may be reversely rotated and rewound by driving the control section 127 and the motor driver 141 described later.

In addition, instead of providing the rewinding motor mechanism 24, the screen member 12 is pulled out in accordance with a user's manual, and is hooked at the lower edge portion of the screen box B, whereby restoration of the screen S1 may be achieved.

Furthermore, with respect to connection and disconnection of the screen member 12, it is also preferable that a user mounts or demounts the screen member 12 without providing an electrically driven function in particular.

In the above-described embodiment, the screen member 12 may be housed at the right side face or at the left side face although the screen member 12 is housed upwardly and downwardly. That is, it is preferable that a motor mechanism or the like similar to the above-described mechanism is provided to house the screen member 12 at the right side face or at the left side face of the screen box B, or a take-up feature is provided to house the screen member in space of the cabinet of the screen box B.

Connector Unit 16

Further, referring to FIG. 9, a description will be given below with respect to an embodiment of the connector unit 16 for reliably and stably connecting the screen box B on the ceiling or the like of the vehicle C. The projecting apparatus has a predetermined weight. If the apparatus is not stably fixed to the ceiling or the like, there occurs a failure that a picture itself vibrates because it is affected by vehicle traveling. Thus, the projecting apparatus must be reliably installed on the ceiling or the like of the vehicle C.

In FIG. 9, a connector unit 16-1 is connected to a metallic ceiling plate C of the vehicle C by means of welding or the like on the assumption that the connector unit bears a weight load equal to or greater than a weight of the projecting apparatus serving as a main body. The connector unit 16-1 used here has an arm section, i.e., has a feature together with an arm portion which can be fixed to be engaged with a connector unit 16-2.

Further, the other connector unit 16-2 is provided by a feature welded with a screw 17, the feature being capable of fixing the screw 17 through the connector unit 16-2 by means of a nut or the like. The connector unit 16-2 is connected to the screen box B via the screw and nut, thereby achieving a required weight resistance load equal to or greater than the weight of the projecting apparatus serving as a main body.

The connector unit 16 is not limited to the present embodiment, and achieves the required weight resistance load in accordance with various embodiments. For example, the connector 16 may not be engaged by separating it into two sections, and may be achieved by one member.

The projecting apparatus according to the present invention is designed as a pure product of the vehicle C from the start, whereby, for example, a jig (to be covered with a cap or the like when the projecting apparatus cannot be mounted) is formed, the jig having a mount screw-like function of directly mounting the projecting apparatus on the ceiling plate of the vehicle C. A dedicated jig having nut-like function is coupled with this jig, whereby the screen box B may be fixed.

It is also preferable that a required weight resistance load is achieved between the ceiling plate of the vehicle C and the screen box B by using an adhesive or a magnet member.

(Configuration of Projector Section 11)

Such a projector section 11 has the following configuration as shown as an example in FIG. 10. In the figure, an example of a general three-plate type LCD projector is shown. That is, the projector section 11 in FIG. 10 is configured such that, as input terminals or the like which can be wired via the wiring line 21 described above with reference to FIG. 5 or the like, there are connected to an input selector section 12 at least: a D-SUB terminal 113 to which a computer or the like is mainly connected; a YCbCr terminal 114 to which a business use video tape recorder (VTR), a BS digital tuner, a DVD player and the like are often connected; an S video terminal 115 for use in VTR, television or the like; and a CVBS terminal 116 for composite signals. Furthermore, a voice terminal 118 is connected to an audio preamplifier section 121. In the audio preamplifier section 121, processing operation such as volume and sound quality or echo effect processing operations have been made to an input signal, and then the input signal is supplied to an audio amplifier section 122.

Still furthermore, in an input selector section 120, an RGB signal selected and converted into a picture is supplied to a control section 127. Operating processes of the input selector section 120 and audio preamplifier section 121 are controlled in response to a control signal from the control section 127.

Yet furthermore, the projector section has a power switch provided at the main body; an operating section 123 such as operating switches; an operating display section 123-2 for displaying operational information; a remote controller section 124 for carrying out a process for communication with a remote controller R; and a memory section 126. These elements are connected to the control section 127, respectively. In addition, the control section 127 has a memory section 128, and further, a focus motor/zoom motor 139 incorporated in a lens unit 131-2 is connected via a motor driver 137 for driving the motor.

The projector section further has: a video processing section 134 for applying picture processing upon the receipt of an output from the control section 127; an expanding section 135 for expanding a picture signal processed as a picture by means of the video processing section 134 for R, G, and B signals; and an R liquid crystal display section 136R, a G liquid crystal display section 136G, and a B liquid crystal display section 138B for displaying an image on a liquid crystal screen or the like.

The projector section 11 further has a power supply section 129. From the power supply section 129, a drive current having a desired output rate is supplied to a lamp section 131. At the lamp section 131, the projection light after projected reaches and transmits the liquid crystal display sections 136R, 136G, and 136B, respectively, and the projection light having a picture loaded thereon is projected on a screen or the like.

Furthermore, as optical elements of the projector section 11, the irradiation light irradiated from the lamp section 131 passes through a multi-lens and a convex lens provided adjacent thereto, although not shown. The resulting light passes through a transmission mirror or reflects the mirror, and then, transmits each of the liquid crystal panels 136R, 136G, and 136B. In this manner, the irradiation light from the projector lamp 131 is irradiated from the lens unit 131-2 with a picture loaded thereon, and focuses a picture on a screen or the like on which projection light is to be projected. The lens unit 131-2 used here incorporates a focus motor/zoom motor M, and carries out proper focus control and zoom control, respectively, after a control signal has been supplied from the control section 127.

In FIG. 10, the remote controller R for use in the projector section 11 according to the embodiment of the present invention has: input switch buttons for switching an input signal; Select/OK buttons for making selection or determination in menu selection or adjustment; cursor keys; a menu button for menu display; and further, screen switches 1 to 4 (151) for calling screens 1 to 4.

When the projector section 11 according to the embodiment of the present invention is connected to an external device, for example, a video deck which is an external input device is connected by using the composite terminal 116, the audio terminal 118, and the S video terminal 115. In addition, the projector section 11 and a DVD player which is an external input device are connected to each other by using the YCbCr terminal 114. In general, the projector section 11 according to the embodiment of the invention and a personal computer which is an external input device are connected to each other by using the D-SUB terminal 113.

(Basic Operation)

Now, an operation of the above-described projector section 11 will be described in detail with reference to the accompanying drawings. First, the projector section 11 is started up upon the receipt of operation of power supply of the operating section 123 or remote controller R, and a picture signal specified by input switch buttons or the like is selected by the input selector section 120. That is, in this case, when "YPbPr" is selected, for example, by operation of the input switch button of the remote controller R, a component picture signal is selected from the external DVD player via the YPbPr terminal 14 by means of the input selector section 120. Then, as the component picture signal, an RGB signal is outputted after a signal type has been determined by the input selector section 120, and an image converting process has been carried out in response to the signal type.

The RGB signal supplied from the input selector section 120 is supplied to the control section 127 while a control signal is supplied to the video processing section 134 by the mode setting section 33 in response to a picture format or picture size specified by a size button. The video processing section 134 applies an image converting process to the RGB signal supplied from the control section in response to the supplied control signal, and converts a current state into the required picture format or picture size.

Processing operations applied to the picture signal in accordance with a front system and a rear system of each of screen types S1 to S4 described later can be carried out in the above-described video processing section 134 or RGB expanding section 135, and further, in the R, G, and B liquid crystal display sections 136R, 136G, and 136B, respectively. Therefore, a picture signal is processed in accordance with the front system and rear system in response to an operation of the screen switch 151 or the like of the remote controller R described later.

Further, if an operation for making a selection of a picture mode is, for example, "CINEMA", image processing is applied to an RGB signal in order to establish a picture mode according to the selected mode, and a current state is converted into a cinema picture signal, for example.

The converted picture signal is supplied from the video processing section 134 to the expanding section 135, and the supplied signal is expanded for R, G, and B signals. These expanded signals are displayed as pictures, respectively on the R liquid crystal display section 136R, the G liquid crystal display section 136G, and the B liquid crystal display section 136B. On the other hand, a lamp driver section 130 to which power has been supplied from the power supply section 129 supplies a drive current to the lamp section 131 upon the receipt of control such as 100% output or 50% output. The lamp section 131 emits projection light in response to this drive current. The emitted projection light passes through a multi-lens and a convex lens provided adjacent thereto, although not shown. The resulting light passes through or reflects a transmission mirror, and transmits each of the liquid crystal panels 136R, 136G, and 136B. In this manner, the projection light from the projector lamp 131 is irradiated via the lens unit 131-2 in a state in which a picture is loaded, and focuses a picture on a screen (not shown) on which the projection light is to be projected.

Furthermore, in the lens unit 131-2, a control signal generated at the control section 127 is supplied to the focus motor M or zoom motor M in response to an operation of a zoom button or the like of the remote controller section 124, and proper focus control or zoom control is provided to the projection light.

As has been described above, in the projector section 11 having such a basic function, a variety of settings according to screen types (blocks B1 to B4) and an application process of these settings are carried out in response to the screen switch 151 of the remote controller R or the like, for example.

Setting Process and Application Process of Screen Switch

Now, a description will be given with respect to a setting process and an application process according to the screen switch 151 of the remote controller R (or on the operating section 123) peculiar to one embodiment of the present invention. In a flow chart of FIG. 11, mainly in response to an operation of the remote controller R, their preset values are provided as default values at the time of shipment on at least four types of screens (not limited thereto).

In the case where the projecting apparatus according to the embodiment of the invention is provided as a pure product of one vehicle type, a variety of preset values can be determined fairly precisely at the time of factory shipment, thus making it possible to set valid default values.

Furthermore, by a user's operation, an optimal value is determined and set and these settings can be called by further operation while a picture is actually projected on a screen, as indicated in a flow chart of FIG. 11. When the remote controller 124 receives an operating signal in response to the operation of the screen switch 151 of the remote controller R, these operating signals are supplied to the control section 127. The control section 127 stores a variety of preset values in response to the specified screen type or reproduces and uses the settings of the screen specified while in use.

That is, when a user presses a screen switch 1 (151) together with a mode setting switch (not shown) by the screen switch 151 of the remote controller R, a variety of settings for the screen switch 1 are stored by the control section 127. That is, while setting the screen S1 manually or by working of the motor mechanism 22 or the like, supplying a picture signal from an on-board DVD or TV tuner to the projector section 11, and projecting a picture on the screen S1, the user sets an optimal focus and brightness, a rear system (screen S1 is limited to rear system), a speaker destination (speaker SP1 or SP2 and the like), voice characteristics (volume, sound quality, echo and the like), color characteristics, and the like (block B11). When a best point is determined, this point is stored as setting of the screen S in a storage region (block B12).

Similarly, when the user presses a screen switch 2 (151) is pressed together with a mode setting switch (not shown) by the screen switch 151 of the remote controller R, a variety of settings for the screen switch 2 are stored by the control section 127. That is, while setting the screen S2, supplying a picture signal to the projector section 11, and projecting a picture on the screen S2, the user sets an optimal focus and brightness, a front system (screen S2 is limited to front system), a speaker destination (speaker SP3 or the like), voice characteristics (volume, sound quality, echo and the like), color characteristics, and the like (block B13). When a best point is determined, this point is stored as setting of the screen S2 in a storage region (block B14).

Similarly, when the user presses a screen switch 3 (151) is pressed together with a mode setting switch (not shown) by the screen switch 151 of the remote controller R, a variety of settings for the screen switch 3 are stored by the control section 127. That is, while setting the screen S3, supplying a picture signal to the projector section 11, and projecting a picture on the screen S3, the user sets an optimal focus and brightness, a rear system (screen S3 is limited to rear system), a speaker destination (speaker SP3 or the like), voice characteristics (volume, sound quality, echo and the like), color characteristics, and the like (block B15). When a best point is determined, this point is stored as setting of the screen S3 in a storage region (block B16).

Similarly, when the user presses a screen switch 4 (151) is pressed together with a mode setting switch (not shown) by the screen switch 151 of the remote controller R, a variety of settings for the screen switch 4 are stored by the control section 127. That is, while setting the screen S4, supplying a picture signal to the projector section 11, and projecting a picture on the screen S4, the user sets an optimal focus and brightness, a rear system (screen S4 is also limited to rear system), a speaker destination (speaker SP3 or the like), voice characteristics (volume, sound quality, echo and the like), color characteristics, and the like (block B17). When a best point is determined, this point is stored as setting of the screen S4 in a storage region (block B18).

Then, by the user's operation, the screen switch 151 is operated by the remote controller R or the like, and the desired screens S1 to S4 are called. Then, the corresponding settings are called from a storage region, and a focus, brightness, a front/rear system, a speaker destination, voice characteristics, color characteristics, brightness and the like are optimized, and picture light is projected.

In response to the front system or the rear system, the screen S1 of the screen box B is removed from the passage of projection light by means of the motor mechanisms 22 and 23 or is installed, thereby facilitating settings. In the case of manual setting specification, a user may be prompted to provide the settings of the screen S1 or the like by working of the control section 127, the memory section 128, the audio amplifier section 121 and the audio amplifier section 122.

Furthermore, as the user's using method, there is a case in which one of the methods shown in FIG. 1B and FIG. 2A is used. Therefore, in the case where the screen 1 has been removed, it is preferable that the front system or the rear system is stored in advance in the memory section 128 of the projecting apparatus and that a picture and a voice should be irradiated or outputted in accordance with the stored system.

As has been described above, in the image pickup apparatus according to the embodiment of the present invention, use of a plurality of desired screens S1 to S4 can be called by the remote controller R or the like, and a picture can be viewed in accordance with various methods according to a situation. In this manner, while driving or at a drive destination, a picture can be easily viewed on a large screen in accordance with a desired method.

According to a variety of the embodiments described above, the present invention can be achieved by one skilled in the art. Further, a variety of modified examples of these embodiments can be readily conceived by one skilled in the art, thereby making it possible to apply to a variety of embodiments even if one does not have inventive ability. Therefore, the present invention encompasses a broad scope without deviating from the disclosed principles and novel features, and is not limited to the above-described embodiments.

For example, while the foregoing embodiments have described a case in which four screens are present, screen types are not limited thereto. A variety of screen modes can occur in response to a user's demand or situation and specification, and all of these modes are included in the scope of the embodiments of the present invention.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A projecting apparatus comprising:
  a projector section which projects projection light in response to an inputted picture signal;
  a cabinet section which stores the projector section;
  a connector section having a function of connecting the cabinet section to a vehicle interior ceiling;
  a first screen section provided on one side face of the cabinet section, the first screen section having a transmission type screen member which displays a picture when projection light is irradiated from the projector section, and also having a motor mechanism to selectively remove the screen member from a passage of the projection light or attachably demount the screen member from the cabinet section, thereby irradiating the projection light to the outside of the cabinet section;
  a second screen section installed outside of the cabinet section, the second screen section being installed on the passage of the projection light from the projector section so as to be viewed from an inside of the vehicle; and
  a third screen section installed outside of the cabinet section, the third screen section being installed on the passage of the projection light from the projector section so as to be viewed from outside of the vehicle;
  a remote controller section having a screen switch which specifies one of the first to third screen sections, and in the case where the second or third screen section is specified by operating the screen switch of the remote controller section, removing the screen member from the passage of the projection light by using the motor mechanism of the first screen section, and irradiating irradiation light to the second or third screen section; and
  a control unit configured to remove the screen member from a passage of projection light in accordance with a control signal from the remote controller.

2. A projecting apparatus according to claim 1, wherein the control section is further configured to (a) measure and set a focus position in the case where the projection light is projected on the screen member; (b) measure and set a focus position in the case where projection is carried out on a screen outside of the cabinet section, the screen being installed on the passage of the projection light; (c) determine a rear system or a front system and a focus position based on a setting corresponding to a screen specified by an operating signal from an operating section; and (d) project the projection light on the screen specified based on the settings.

3. A projecting apparatus according to claim 1, wherein the control section is further configured to (a) in the case where the projection light is projected on the screen member, set optimal values of brightness and color characteristics in the case where projection is carried out on a screen outside of the cabinet section, the screen being installed on the passage of the projection light; (b) determine brightness and color characteristics based on a setting corresponding to a screen specified by an operating signal from an operating section; and (c) project the projection light in accordance with the brightness and color characteristics.

4. A projecting apparatus according to claim 1, wherein the control section is further configured to (a) set a voice output destination and optimal voice characteristics in the case where the projection light is projected on the screen member of the screen section; (b) set a voice output destination and optical voice characteristics in the case where projection is carried out on a screen outside of the cabinet section, the screen being installed on the passage of the projection light; (c) determine a voice output destination and optimal voice characteristics based on a setting corresponding to a screen specified by an operating signal from an operating section; (d) correct a given voice signal in accordance with the voice characteristics; and (e) output the thus corrected voice signal to the output destination.

5. A projecting apparatus according to claim 1, wherein the control section is further configured to (a) in the case where projection is carried out on the screen member of the screen section in response to an operating signal from an operating section, carry out projection of the projection light without moving the screen member; or (b) in the case where projection is carried out on a screen outside of the cabinet section, the screen being installed on the passage of the projection light, move the screen member and irradiate the projection light on the screen outside of the cabinet section.

6. A screen box apparatus comprising:
a cabinet section having a structure for storing a projector section which projects projection light;
a connector section having a function of connecting the cabinet section to a vehicle interior ceiling;
a first screen section provided on one side face of the cabinet section, the first screen section having a transmission type screen member which displays a picture when projection light is irradiated from the projector section, and also having a motor mechanism to selectively remove the screen member from a passage of the projection light or attachably demount the screen member from the cabinet section, thereby irradiating the projection light to the outside of the cabinet section;
a second screen section installed outside of the cabinet section, the second screen section being installed on the passage of the projection light from the projector section so as to be viewed from an inside of the vehicle; and
a third screen section installed outside of the cabinet section, the third screen section being installed on the passage of the projection light from the projector section so as to be viewed from outside of the vehicle;
a remote controller section having a screen switch which specifies one of the first to third screen sections, and in the case where the second or third screen section is specified by operating the screen switch of the remote controller section, removing the screen member from the passage of the projection light by using the motor mechanism of the first screen section, and irradiating irradiation light to the second or third screen section; and
a control unit configured to remove the screen member from a passage of projection light in accordance with a control signal from the remote controller.

7. A projecting method for a projection system which comprises:
a projector section which projects projection light in response to an inputted picture signal;
a cabinet section which stores the projector section;
a connector section having a function of connecting the cabinet section to a vehicle interior ceiling;
a first screen section provided on one side face of the cabinet section, the first screen section having a transmission type screen member which displays a picture when projection light is irradiated from the projector section, and also having a motor mechanism to remove the screen member from a passage of the projection light;
a second screen section installed outside of the cabinet section, the second screen section being installed on the passage of the projection light from the projector section so as to be viewed from an inside of the vehicle; and
a third screen section installed outside of the cabinet section, the third screen section being installed on the passage of the projection light from the projector section so as to be viewed from outside of the vehicle, the projection method comprising:
using a remote controller section having a screen switch which specifies one of the first to third screen sections, and in the case where the second or third screen section is specified by operating the screen switch of the remote controller section, removing the screen member from the passage of the projection light by using the motor mechanism of the first screen section, and irradiating irradiation light to the second or third screen section.

* * * * *